United States Patent [19]

Frank

[11] Patent Number: 4,667,194

[45] Date of Patent: May 19, 1987

[54] MONITORING SYSTEM FOR USE WITH ELONGATE HEATER UNITS

[75] Inventor: Louis M. Frank, Sunnyvale, Calif.

[73] Assignee: Raychem Corporation, Menlo Park, Calif.

[21] Appl. No.: 667,799

[22] Filed: Nov. 2, 1984

[51] Int. Cl.[4] ............................................. G08B 21/00
[52] U.S. Cl. ................................. 340/870.17; 374/166
[58] Field of Search .......... 340/870.17, 310 R, 825.76, 340/584, 310 A; 374/164, 166, 167; 219/104, 494, 506; 156/359

[56] References Cited

U.S. PATENT DOCUMENTS 3,204,245  8/1965  Dykaar ....................... 340/310 A X
4,560,431 12/1985  Inselmann ......................... 156/359

FOREIGN PATENT DOCUMENTS 121990  5/1985  European Pat. Off. .
3340371 5/1985  Fed. Rep. of Germany .

Primary Examiner—Jerry W. Myracle
Attorney, Agent, or Firm—Timothy H. P. Richardson; Herbert G. Burkard

[57] ABSTRACT

A monitoring system that may be employed with elongate heater units to provide information about a measurable parameter, for example the temperature of a heated substrate. The monitoring system may include many heater units and associated transmitter-receiver assemblies. The heater units as well as the assemblies can all be of the same kind. The many heater units and assemblies can be connected to a common power supply and the monitoring system can correlate the information provided by a particular receiver with a particular heater unit.

8 Claims, 7 Drawing Figures

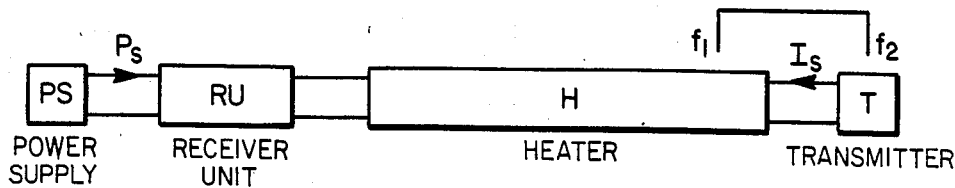
FIG_1
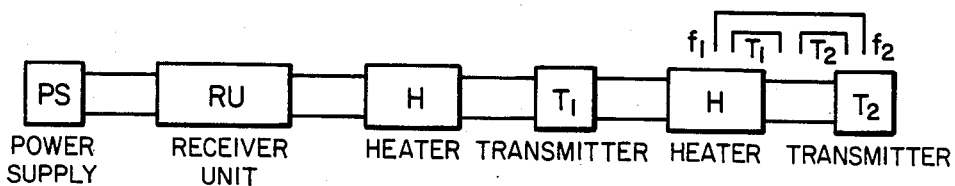
FIG_2
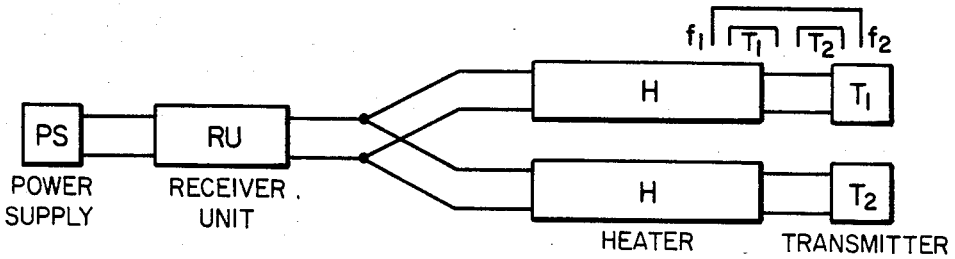
FIG_3
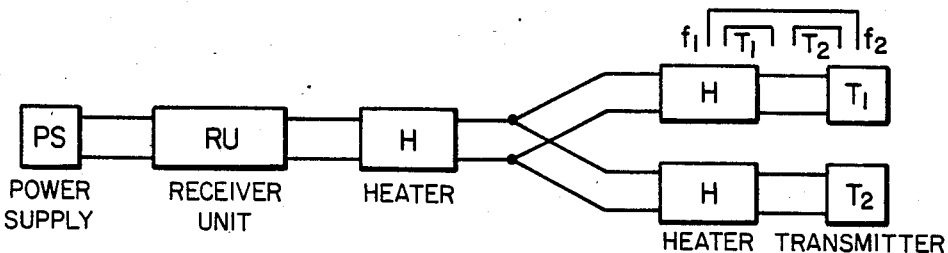
FIG_4

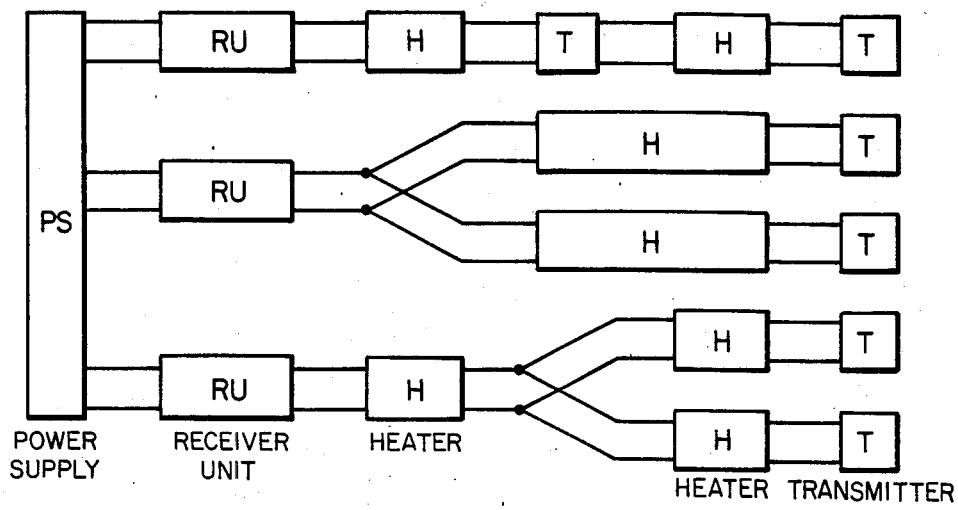
FIG_5
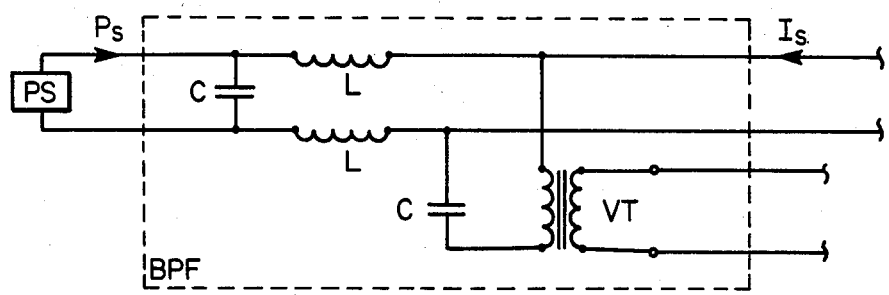
FIG_6
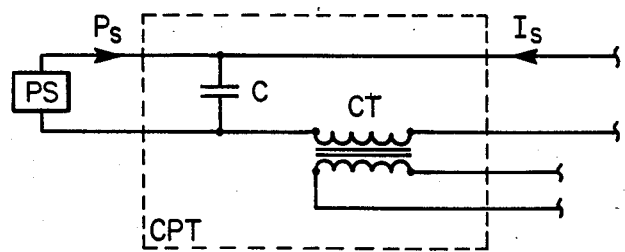
FIG_7

MONITORING SYSTEM FOR USE WITH ELONGATE HEATER UNITS

BACKGROUND OF THE INVENTION

1. Field of the Invention

This invention relates to elongate heater units and in particular to a monitoring system suitable for use with such units.

2. Introduction to the Invention

Elongate heater units are well known and may be employed to provide heat to a substrate. Monitoring systems that may be employed with such heater units typically provide information about a measurable parameter, for example, the temperature of the heated substrate.

SUMMARY OF THE INVENTION

One monitoring system that may be employed to this end includes a transmitter-receiver assembly that is connectable to the heater unit. The assembly and the heater unit may be powered by a common power supply e.g., a 120 V, 60 hz supply.

It is advantageous to be able to extend the capabilities of such a monitoring system so that it includes many such heater units and associated transmitter-receiver assemblies. I have discovered that serious difficulties can arise if such an extended system includes a plurality of similiar heater units, transmitters and receivers. For example, an information signal provided by a transmitter that monitors an indentifiable heater unit, may be indiscriminately picked up and carried by a common power supply to the plurality of similiar receivers. A particular receiver, however, cannot uniquely correlate the information signal with the identified heater unit. As a result, a receiver provides information to an observer, but the observer cannot determine which particular heater unit, out of the plurality of such heater units, is supplying the observed information.

One very costly remedy to this difficulty requires a plurality of different pairs of transmitter/receiver assemblies which cannot receive or respond to each other's information signals. Another very impractical remedy is to employ a unique power supply for each transmitter-receiver assembly. The present invention, in contrast, provides an inexpensive solution to the cited difficulty. An added benefit of the present invention is that the monitoring system may employ a common power supply.

Accordingly, in one aspect the invention provides a monitoring system comprising a circuit comprising (a) a first elongate heater unit which can be connected to a power supply to cause a power signal to pass through the unit;

(b) a first transmitter connected to one end of the first heater unit and capable of transmitting a first information signal through the first heater; and (c) a first receiver unit connected to the other end of the first heater unit for receiving the first information signal;

the system being such that if a power supply is connected to the first heater unit and to a second circuit comprising (a) a second elongate heater unit which can be connected to the power supply to cause a power signal to pass through the second unit;

(b) a second transmitter connected to one end of the second heater unit and capable of transmitting an information signal through the second heater; and (c) a second receiver unit connected to the other end of the second heater unit for receiving the second information signal and that is capable of receiving the first information signal;

the first receiver unit observes the first information signal but not the second information signal, and the second receiver unit observes the second information signal but not the first information signal.

In another aspect, the invention comprises a monitoring system comprising a first circuit comprising (a) a first elongate heater unit which can be connected to a power supply to cause a power signal to pass through the unit;

(b) a first transmitter connected to one end of the first heater unit and capable of transmitting a first information signal through the first heater; and (c) a first receiver unit connected to the other end of the first heater unit for receiving the first information signal;

and a second circuit comprising (a) a second elongate heater unit which can be connected to the power supply to cause a power signal to pass through the second unit;

(b) a second transmitter connected to one end of the second heater unit and capable of transmitting a second information signal through the second heater; and (c) a second receiver unit connected to the other end of the second heater unit for receiving the second information signal and that is capable of receiving the first information signal;

the system being such that if a common power supply is connected to the first and second heater units, the first receiver unit observes the first information signal but not the second information signal, and the second receiver unit observes the second information signal but not the first information signal.

BRIEF DESCRIPTION OF THE DRAWING

The invention is illustrated in the accompanying drawing, in which

FIG. 1 is a circuit representing a first embodiment of the invention.

FIG. 2 is an embodiment similar to FIG. 1 but containing series circuit elements.

FIG. 3 is an embodiment containing parallel circuit elements.

FIG. 4 is an embodiment having combined series and parallel elements.

FIG. 5 is an embodiment having a more elaborate configuration than FIG. 4.

FIG. 6 is a band pass filter circuit which can be used with the FIG. 1 through FIG. 5 embodiments.

FIG. 7 is a band pass filter circuit which can be made to occupy less space than the FIG. 6 circuit.

DETAILED DESCRIPTION OF THE INVENTION

The invention makes use of a transmitter and a receiver unit. Conventional transmitters and receiver units can be used for this purpose.

The transmitter transmits a fixed signal or an information signal which corresponds to a measured parameter e.g., temperature or pressure. The information signal preferably defines a frequency spectrum that has a preselected upper and lower frequency limit, for example, 10 k hz to 400 k hz.

The receiver unit preferably comprises a band pass filter and a receiver. The band pass filter passes the information signal to the receiver, prevents it from reaching the power supply, and preferably operates so that the receiver unit does not receive or observe the power signal. The received signal from the transmitter verifies the continuity of the heater unit. The band pass filter preferably is a passive filter, although an active band pass filter can be used. Preferably, the band pass filter comprises an inductance-capacitance network, or, a current transformer network and an electrically connected capacitive network.

Although the band pass filter is preferred, the receiver unit may comprise a high pass filter and a receiver, the high pass filter passing the information signal to the receiver and preventing it from reaching the power supply.

The elongate heater unit which is connected between the receiver unit and the transmitter is preferably self-regulating and may be, for example, a constant voltage series heater or a zone parallel heater. The heater unit may be adapted to operate when supplied with alternating current having a frequency range of 50 hz to 400 hz.

The invention is of particular value when it is desired to monitor a system comprising a plurality of heaters. One example of this situation is when the monitoring system comprises at least one of the following structures:

(A) a series structure which comprises
  (i) a plurality of heating modules which are connected in series and each of which comprise
    (a) an elongate heater unit which can be connected to a power supply to cause a power signal to pass through the unit;
    (b) a transmitter connected to one end of the heater unit and capable of transmitting an information signal through the heater;
  and
  (ii) a receiver unit connected to one end of the series structure which can observe all the information signals;
and
(B) a parallel structure which comprises
  (i) a plurality of heating modules which are connected in parallel and each of which comprise
    (a) an elongate heater unit which can be connected to a power supply to cause a power signal to pass through the unit;
    (b) a transmitter connected to one end of the heater unit and capable of transmitting an information signal through the heater;
  and
  (ii) a receiver unit connected to one end of the parallel structure which can observe all the information signals.

In this expanded monitoring system, each transmitter in any particular series or parallel structure preferably transmits an information signal having frequency components that are preselected and within a finite and unique portion of a frequency spectrum.

The invention is also of particular value when it is desired to monitor a system comprising a plurality of heaters in an arrangement that comprises a plurality of circuits connected in parallel, each of the circuits comprising (a) an elongate heater unit which can be connected to a power supply to cause a power signal to pass through the unit;
(b) a transmitter connected to one end of the heater unit and capable of transmitting an information signal through the heater; and
(c) a receiver unit connected to the other end of the heater unit for receiving the information signal.

For further flexibility and expansion, at least one of the circuits which are connected in parallel can comprise at least one of the following:

(A) a series structure which comprises
  (i) a plurality of heating modules which are connected in series and each of which comprise
    (a) an elongate heater unit which can be connected to a power supply to cause a power signal to pass through the unit;
    (b) a transmitter connected to one end of the heater unit and capable of transmitting an information signal through the heater;
  and
  (ii) a receiver unit connected to one end of the series structure which can observe all the information signals;
and
(B) a parallel structure which comprises
  (i) a plurality of heating modules which are connected in parallel and each of which comprise
    (a) an elongate heater unit which can be connected to a power supply to cause a power signal to pass through the unit;
    (b) a transmitter connected to one end of the heater unit and capable of transmitting an information signal through the heater;
  and
  (ii) a receiver unit connected to one end of the parallel structure which can observe all the information signals.

For this monitoring system, each transmitter in any particular series or parallel structure preferably transmits an information signal having frequency components that are preselected and within a finite and unique portion of a frequency spectrum.

Referring now to the drawing, the circuits shown in FIGS. 1 to 5 are examples of the invention. They all have in common a transmitter and receiver unit connected to opposite ends of the elongate heater unit.

FIG. 1 includes a circuit comprising an elongate heater unit (H) connected at one end to a receiver unit (RU) and at the other end to a transmitter (T). The transmitter provides an information signal $I_s$ that has a preselected lower and upper frequency limit $f_1$, $f_2$ respectively. Also shown is a power supply (PS) which provides a power signal $P_s$ having frequency components outside the spectrum $f_1$, $f_2$. The power supply (PS) powers the receiver unit (RU), the transmitter (T) and the heater unit (H).

FIG. 2 is identical in operation to the FIG. 1 circuit except that the circuit now includes a series structure comprising a plurality of heater units (H) and transmitters ($T_1$, $T_2$) connected in series and alternately. The transmitters ($T_1$, $T_2$) each transmit an information signal $I_s$ having frequency components that are separated from each other and are within the spectrum $f_1$, $f_2$.

FIG. 3 is identical in operation to the FIG. 1 circuit except that it now includes a parallel structure comprising a plurality of modules connected in parallel. Each module comprises an elongate heater unit, a transmitter and the receiver unit connected to one end of the parallel structure which can observe all the information signals.

FIG. 4 combines the series structure of FIG. 2 with the parallel structure of FIG. 3.

FIG. 5 expands the components required in the FIG. 1 circuit and comprises a plurality of circuits (3) connected in parallel. Each of the circuits comprises an elongate heater unit (H), a transmitter (T) and a receiver unit (RU). The number of such parallel circuits can be extended indefinitely. The first parallel circuit shown in FIG. 5 has a series structure, of the type shown in FIG. 2; the second parallel circuit shown in FIG. 5 has a parallel structure, of the type shown in FIG. 3; and the third parallel circuit shown in FIG. 5 has a combined series/parallel structure, of the type shown in FIG. 4. The three circuits are all connected to a common power supply, (PS).

Attention is now directed to FIGS. 6 and 7 which show circuits of a band pass filter that can be employed in the circuit of FIGS. 1 through 5. In particular, FIG. 6 shows an inductance-capacitance (LC) band pass filter. The filter has lower and upper frequency limits $f_1$, $f_2$. This allows the information signal $I_s$ to pass through the filter, by way of a voltage transformer (VT), and pass on to the receiver (not shown). However, the information signal $I_s$ cannot pass through the filter so as to reach the power supply. And, the power signal cannot pass through the filter and reach the receiver. FIG. 7 is similar to FIG. 6 except that a current transformer (CT) responds to the information signal $I_s$, allowing it to pass to the receiver (not shown). The capacitive network (c) prevents the information signal from passing through the filter and reaching the power supply. At the same time, the capacitive network prevents the power signal from reaching the receiver. The band pass filter of FIG. 7 has a benefit over the filter of FIG. 6 in that it can be designed to occupy a significantly reduced space.

EXAMPLE

A heater unit Model No. 4BTV1 available from Raychem Corporation, Menlo Park, Calif. was connected between a transmitter and a receiver to a form a first circuit. The transmitter comprised a temperature controlled voltage source, a voltage controlled oscillator and a power amplifier. The frequency spectrum of the transmitter was 40 K hz, 65K hz and it was powered by a 60 hz, 120 V supply common to the heater. The receiver unit comprised an inductance-capacitance band pass filter and a receiver, and the receiver comprised an amplifier and a signal detector. The filter, in particular, comprised a pair of 500 microhenry inductances in series and a 0.0068 microfarad capacitor connected in series with the inductances and a 10:1 voltage transformer. Two such identical circuits were connected in parallel to the common supply.

I claim:

1. A monitored heating system comprising
   (1) an AC power supply having a frequency of 50 to 400 hz and
   (2) a plurality of monitored heating circuits which are connected to the power supply in parallel with each other and each of which comprises
      (a) an elongate self-regulating heater which comprises
         (i) two elongate electrodes which are connected to the power supply and each of which has a near end and a far end, the near ends of the electrodes being closer to the power supply than the far ends; and
         (ii) a plurality of resistive heating elements connected in parallel between the electrodes;
      (b) a transmitter connected to the far end of at least one of the electrodes and capable of transmitting an information signal having a frequency in the range of 10 Khz to 40 Khz along said electrode to the near end thereof; and
      (c) a receiver unit connected to the near end of said electrode for receiving said information signal; the transmitters and the receiver units being such that each receiver unit observes the information signal from the transmitter in the same heating circuit but not the information signal from the transmitters in the other heating circuits.

2. A system according to claim 1, wherein each receiver unit comprises a band pass filter and a receiver, and the band pass filter passes the information signal to the receiver and prevents it from reaching the power supply.

3. A system according to claim 2, wherein the band pass filter comprises an inductance-capacitance network.

4. A system according to claim 2, wherein the band pass filter comprises a current transformer network and a capacitive network.

5. A system according to claim 1, wherein each transmitter transmits an information signal which corresponds to a measured parameter.

6. A system according to claim 1, wherein at least one of the monitored heating circuits is a series structure which has a near end and a far end, the near end being closer to the power supply than the far end and which comprises
   (A) a plurality of heating modules which are connected in series and each of which comprises
      (a) an elongate self-regulating heater which comprises
         (i) two elongate electrodes whch are connected to the power supply and each of which has a near end and a far end, the near ends of the electrodes being closer to the power supply than the far ends; and
         (ii) a plurality of resistive heating elements connected in parallel between the electrodes; and
      (b) a transmitter connected to the far end of at least one of the electrodes and capable of transmitting an information signal along said electrode, the signal having a frequency which is in the range of 10 Khz to 400 Khz and which is different from the frequency of the information signal transmitted by any of the other transmitters in the series structure; and
   (B) a receiver unit which is connected to the near end of the series structure and which can observe all the information signals from the transmitters in said plurality of heating modules.

7. A system according to claim 1 wherein at least one of the monitored heating circuits is at least one of the following structures
   (A) a series structure which comprises
      (i) a plurality of heating modules which are connected in series and each of which comprises
         (a) an elongate heater unit which can be connected to a power supply to cause a power signal to pass through the unit;

(b) a transmitter connected to one end of the heater unit and capable of transmitting an information signal through the heater; and (ii) a receiver unit connected to one end of the series structure which can observe all the information signals; and a parallel structure which has a near end and a far end, the near end being closer to the power supply than the far end and which comprises (A) a plurality of heating modules which are connected in parallel and each of which comprise (a) an elongate self-regulating heater which comprises (i) two elongate electrodes which are connected to the power supply and each of which has near end and a far end, the near ends of the electrodes being closer to the power supply than the far ends; and (ii) a plurality of resistive heating elements connected in parallel between the electrodes; and (b) a transmitter connected to the far end of at least one of the electrodes and capable of transmitting an information signal along said electrode, the signal having a frequency which is in the range of 10 Khz to 400 Khz and which is different from the frequency of the information signal transmitted by any of the other transmitters in the parallel structure; and (B) a receiver unit which is connected to the near end of the parallel structure and which can observe all the information signals from the transmitters in said plurality of heating modules.

8. A system according to claim 1 wherein the transmitters in each of the heating circuits are the same.

* * * * *

UNITED STATES PATENT AND TRADEMARK OFFICE
CERTIFICATE OF CORRECTION

PATENT NO. : 4,667,194

DATED : May 19, 1987

INVENTOR(S): Louis M. Frank

It is certified that error appears in the above-identified patent and that said Letters Patent are hereby corrected as shown below.

In Claim 7, column 6, line 61, delete from "at least one of the" through "and" in column 7, line 8.

Signed and Sealed this

Thirteenth Day of October, 1987

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,667,194

DATED : May 19, 1987

INVENTOR(S) : Louis M. Frank

It is certified that error appears in the above-identified patent and that said Letters Patent is hereby corrected as shown below:

In Claim 1, column 6, line 8, delete "40 Khz" and substitute --400 Khz--.

Signed and Sealed this

Fifteenth Day of December, 1987

Attest:

DONALD J. QUIGG

*Attesting Officer*  *Commissioner of Patents and Trademarks*